(12) United States Patent
Ratnasingam et al.

(10) Patent No.: US 12,033,556 B1
(45) Date of Patent: *Jul. 9, 2024

(54) PER-PIXEL COLOR CORRECTION BASED ON AMBIENT LIGHT CHARACTERISTICS

(71) Applicants: Sivalogeswaran Ratnasingam, San Jose, CA (US); Anselm Grundhoefer, Campbell, CA (US); Ralf Habel, Cupertino, CA (US)

(72) Inventors: Sivalogeswaran Ratnasingam, San Jose, CA (US); Anselm Grundhoefer, Campbell, CA (US); Ralf Habel, Cupertino, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/573,571

(22) Filed: Jan. 11, 2022

Related U.S. Application Data

(60) Provisional application No. 63/147,846, filed on Feb. 10, 2021.

(51) Int. Cl.
*G09G 3/20* (2006.01)
*G02B 27/01* (2006.01)
(Continued)

(52) U.S. Cl.
CPC ....... *G09G 3/2003* (2013.01); *G02B 27/0101* (2013.01); *G09G 2320/0242* (2013.01); (Continued)

(58) Field of Classification Search
CPC .......... G09G 3/2003; G09G 5/02; G09G 5/10; G09G 3/22; G09G 2320/0242; G09G 2320/0666; G09G 5/363; G09G 2360/144; G09G 2340/10; G09G 2340/14; G09G 2340/0471; G09G 2340/0478; G09G 3/3225; G09G 3/3233; G09G 3/3208; G09G 3/34; G09G 3/32; G09G 2310/0235; G02B 27/017; G02B 27/0172; G02B 27/0176; G02B 27/0093; G02B 27/283; G02B 27/0149; G02B 27/012; G02B 27/015; G02B 27/0112–0118; G02B 27/0147;
(Continued)

(56) References Cited

U.S. PATENT DOCUMENTS 11,550,157 B2 *  1/2023  Haddick ............ G02B 27/0093
2017/0270707 A1 *  9/2017  Kass .................... G06T 11/001
(Continued)

*Primary Examiner* — Wesner Sajous
(74) *Attorney, Agent, or Firm* — Fernando & Partners, LLP

(57) ABSTRACT

A method is performed at an electronic device with one or more processors, a non-transitory memory, and a see-through display. The method includes determining first and second light superposition values that are associated with ambient light from a physical environment. The first light superposition value quantifies the ambient light incident on a first region of the see-through display. The second light superposition value quantifies the ambient light incident on a second region of the see-through display. The method includes modifying a first pixel value of image data, via a color correction function, in order to generate a corresponding first pixel value of display data. The color correction function is based on a combination of the first and second light superposition values. The method includes displaying the corresponding first pixel value of the display data on the see-through display.

23 Claims, 13 Drawing Sheets

(51) Int. Cl.
*G06T 3/20* (2006.01)
*G06T 11/00* (2006.01)
*G06T 19/00* (2011.01)
*G09G 5/02* (2006.01)
*H04N 1/60* (2006.01)
*H04N 5/57* (2006.01)
*H04N 9/64* (2023.01)
*H04N 9/67* (2023.01)
*H04N 9/69* (2023.01)
*H04N 9/73* (2023.01)

(52) U.S. Cl.
CPC ............... *G09G 2320/0666* (2013.01); *G09G 2360/144* (2013.01)

(58) Field of Classification Search
CPC ............. G02B 27/141; G02B 27/0152; G02B 27/0178; G02B 27/0187; G02B 27/0159; G02B 26/083; G02B 27/0123; G06T 11/001; G06T 3/20; G06T 19/006; H04N 1/60; H04N 1/58; H04N 5/57; H04N 9/64; H04N 9/67; H04N 9/69; H04N 9/73; H04N 9/77

See application file for complete search history.

(56) References Cited

U.S. PATENT DOCUMENTS

| | | | |
|---|---|---|---|
| 2017/0352173 A1* | 12/2017 | Salmimaa | G06T 3/60 |
| 2020/0073128 A1 | 3/2020 | Haddick | |
| 2020/0234501 A1 | 7/2020 | Rodriguez et al. | |
| 2020/0409151 A1 | 12/2020 | Calafiore | |
| 2021/0165225 A1* | 6/2021 | Border | G06F 3/017 |
| 2021/0241676 A1* | 8/2021 | Hazra | G09G 5/02 |
| 2023/0106969 A1* | 4/2023 | Haddick | G02B 27/0075 |
| | | | 359/633 |
| 2023/0130723 A1* | 4/2023 | Osterhout | H04N 13/239 |
| | | | 345/8 |

* cited by examiner

PER-PIXEL COLOR CORRECTION BASED ON AMBIENT LIGHT CHARACTERISTICS

CROSS-REFERENCE TO RELATED APPLICATIONS

This application claims priority to U.S. Provisional Patent App. No. 63/147,846, filed on Feb. 10, 2021, and hereby incorporated by reference in its entirety.

TECHNICAL FIELD

The present disclosure relates to color correction, and in particular, performing color correction with respect to content on a see-through display.

BACKGROUND

A user may experience extended reality (XR) by wearing a head-mountable device (HMD) that includes a see-through display, which in turn, allows light from a physical environment to pass to eyes of the user. However, the HMD cannot effectively perform color correction because the HMD does not account for ambient light from the physical environment. For example, the ambient light interferes with displayed computer-generated content in a manner that degrades the XR experience.

SUMMARY

In accordance with some implementations, a method is performed at an electronic device with one or more processors, a non-transitory memory, and a see-through display. The method includes determining first and second light superposition values that are associated with ambient light from a physical environment. The first light superposition value quantifies the ambient light incident on a first region of the see-through display. The second light superposition value quantifies the ambient light incident on a second region of the see-through display. The method includes modifying a first pixel value of image data, via a color correction function, in order to generate a corresponding first pixel value of display data. The color correction function is based on a combination of the first and second light superposition values. The method includes displaying the corresponding first pixel value of the display data on the see-through display.

In accordance with some implementations, a method is performed at an electronic device with one or more processors, a non-transitory memory, and a see-through display. The method includes determining a light superposition value that quantifies ambient light from a physical environment. The method includes obtaining image data that is associated with a first chroma value. The method includes determining, via a color correction function, a second chroma value based on the first chroma value and the light superposition value. The first chroma value is different from the second chroma value. The method includes generating, from the image data, display data that is associated with the second chroma value. The method includes displaying the display data on the see-through display.

In accordance with some implementations, an electronic device includes one or more processors, a non-transitory memory, and a see-through display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
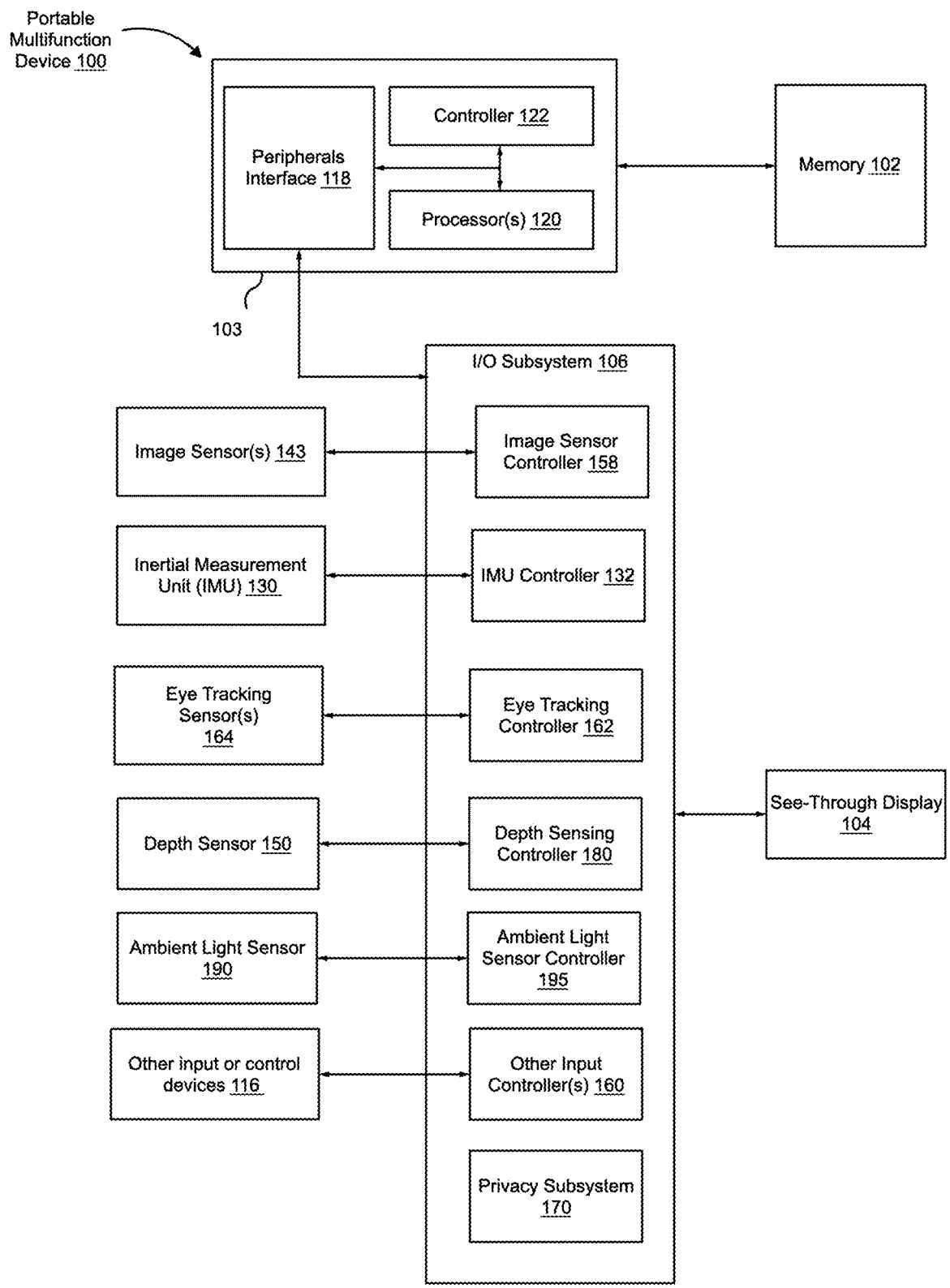
FIG. 1 is a block diagram of an example of a portable multifunction device in accordance with some implementations.

A user may experience extended reality (XR) by wearing a head-mountable device (HMD) that includes a see-through display, which, in turn, allows light from a physical environment to pass to eyes of the user. For example, the see-through display projects computer-generated content to be reflected off of the see-through display to the user's eyes.

As another example, the see-through display projects computer-generated content directly at retinas of the user, and the light from the physical environment and the projected light of the computer-generated content concurrently reach the retinas. However, the HMD cannot effectively perform color correction because the HMD does not account for light from the physical environment. For example, light from the physical environment may have a chromaticity that interferes with computer-generated content in a manner that degrades the AR experience. The chromaticity of the light, such as the presence of predominantly one color, may provide dominant hues that are difficult to mask. The dominant hues associated with the light from the physical environment may interfere with the color characteristics of displayed computer-generated content. Moreover, certain color correction methods that are used in pass-through video display systems, such as spatially varying backlight tinting, are not readily applicable to the see-through display. Additionally, applying previously available tone mapping is not effective because it does not account for luminance or chromaticity features associated with the light.

By contrast, various implementations disclosed herein include methods, electronic devices, and systems for performing color correction on image data, based on one or more light superposition values that are associated with ambient light from a physical environment. To that end, in some implementations, an electronic device includes an environmental sensor (e.g., an ambient light sensor, image sensor) that senses the ambient light and outputs corresponding sensor data, and the electronic device determines the one or more light superposition values based on the corresponding sensor data. Based on the one or more light superposition values, the electronic device performs color correction with respect to image data. The electronic device displays the color corrected image data.

According to various implementations, an electronic device with a see-through display performs per-pixel color correction with respect to image data, based on ambient light from a physical environment. To that end, the electronic device determines first and second light superposition values that are associated with the ambient light. The first light superposition value quantifies the ambient light incident on a first region of the see-through display, and the second light superposition value quantifies the ambient light incident on a second region of the see-through display. For example, a particular light superposition value indicates one or more of a chromaticity characteristic and a luminance characteristic associated with ambient light incident on a corresponding portion of the see-through display. The ambient light enters the see-through display towards the eyes of a user of the electronic device. In some implementations, the first region corresponds to a background region on which displayable content is to be displayed. In some implementations, the second region corresponds to a surrounding region that is outside of (e.g., surrounding) the first region. Based on the first and second light superposition values, the electronic device modifies a first pixel value of image data in order to generate a corresponding first pixel value of display data. For example, the electronic device utilizes a combination of a chromatic adaptation transform (CAT) and a transparency model in order to perform the color correction. The CAT accounts for (e.g., simulates) a human visual system's ability to adjust to changes in illumination in order to preserve the appearance of object colors. For example, the transparency model models perceived transparency as a function of background luminance (e.g., brightness) and a gamut associated with the see-through display. In some implementations, the electronic device performs a two-stage color correction. For example, a first stage utilizes the first light superposition value to perform a first color correction on a pixel of image data, and a second stage utilizes the second light superposition to perform a second color correction on the output of the first stage. In some implementations, the color correction function is also based on metadata, such as a user preference, a use case, type of object of interest represented by the image data, etc.

According to various implementations, an electronic device with a see-through display performs chroma correction based on ambient light from a physical environment. The electronic device generates display data by utilizing a color correction function that accounts for the ambient light. To that end, the electronic device determines a light superposition value that quantifies the ambient light. The color correction function utilizes the light superposition value in order to perform color correction with respect to a first chroma value associated with image data. For example, the electronic device determines a second chroma value based on the light superposition value and the first chroma value, and generates display data (for display on the see-through display) that is associated with the second chroma value. The second chroma value may be greater than the first chroma value, sometimes referred to as "chroma boosting," Chroma boosting may enhance color characteristics of the display data displayed on the see-through display, in view of ambient light that would otherwise degrade the appearance of the display data.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes a see-through display 104 that displays color corrected image data.

In some implementations, the electronic device 100 corresponds to a head-mountable device (HMD) that operates as an additive display by adding computer-generated content (e.g., extended reality (XR) content) to the light from a physical environment, such as an optical HMD (OHMD). For example, in some implementations, the HMD operates as an additive display by projecting computer-generated content to be reflected off of the see-through display 104. As another example, in some implementations, the HMD operates as an additive display by displaying computer-generated content onto an emissive display to the user's eyes. As yet another example, in some implementations, the HMD operates as an additive display by emitting light towards the see-through display 104, such as via a waveguide. As yet another example, in some implementations, the HMD operates as an additive display by projecting computer-generated content directly at the user's retinas, where pass-through light from a physical environment and the projected light of the computer-generated content concurrently reach the retinas.

In some implementations, the see-through display 104 corresponds to a translucent display. In some implementations, the see-through display 104 corresponds to glasses with optical see-through. In some implementations, the see-through display 104 is made of a see-through material (e.g., glass or plastic). In contrast to pure compositing using a video stream, the see-through display 104 is capable of reflecting projected images off of the see-through display 104 while enabling the user to see through the display. In some implementations, the see-through display 104 displays at least a nominal amount of light from a physical environment. In some implementations, the see-through display 104 includes a photochromic lens or an electrochromic layer.

The electronic device 100 includes memory 102 (which optionally includes one or more computer readable storage mediums), a memory controller 122, one or more processing units (CPUs) 120, a peripherals interface 118, an input/output (I/O) subsystem 106, an inertial measurement unit (IMU) 130, image sensor(s) 143 (e.g., a camera), a depth sensor 150, eye tracking sensor(s) 164 (e.g., included within a head-mountable device (HMD)), an ambient light sensor 190, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving a device with a display.

In some implementations, the memory 102 stores image data, which the electronic device 100 color corrects according to various implementations disclosed herein. For example, the image data represents computer-generated content, such as a computer-generated object or a computer-generated surface. The image data may represent two-dimensional (2D) content (e.g., heads-up display (HUD) or mixed reality (MR) image) or three-dimensional (3D) content (e.g., a virtual couch).

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the peripherals interface 118. The I/O subsystem 106 optionally includes an image sensor controller 158, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the peripherals interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 includes an inertial measurement unit (IMU) controller 132 that controls (e.g., manages operations of) the inertial measurement unit (IMU) 130. The IMU 130 may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like. The IMU 130 may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video of a physical environment. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants, etc.). In some implementations, the image sensor(s) 143 corresponds to one or more HMD cameras. In some implementations, the image sensor(s) 143 includes a monochrome or color camera. In some implementations, the image sensor(s) 143 includes an RGB depth (RGB-D) sensor.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

The electronic device 100 includes a depth sensing controller 180 that controls (e.g., manages operations of) the depth sensor 150. In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The electronic device 100 includes an ambient light sensor controller 195 that controls (e.g., manages operations of) the ambient light sensor (ALS) 190. The ALS 190 detects ambient light from a physical environment. In some implementations, the ambient light sensor 190 is a color light sensor. In some implementations, the ambient light sensor 190 is a two-dimensional (2D) or a three-dimensional (3D) light sensor.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
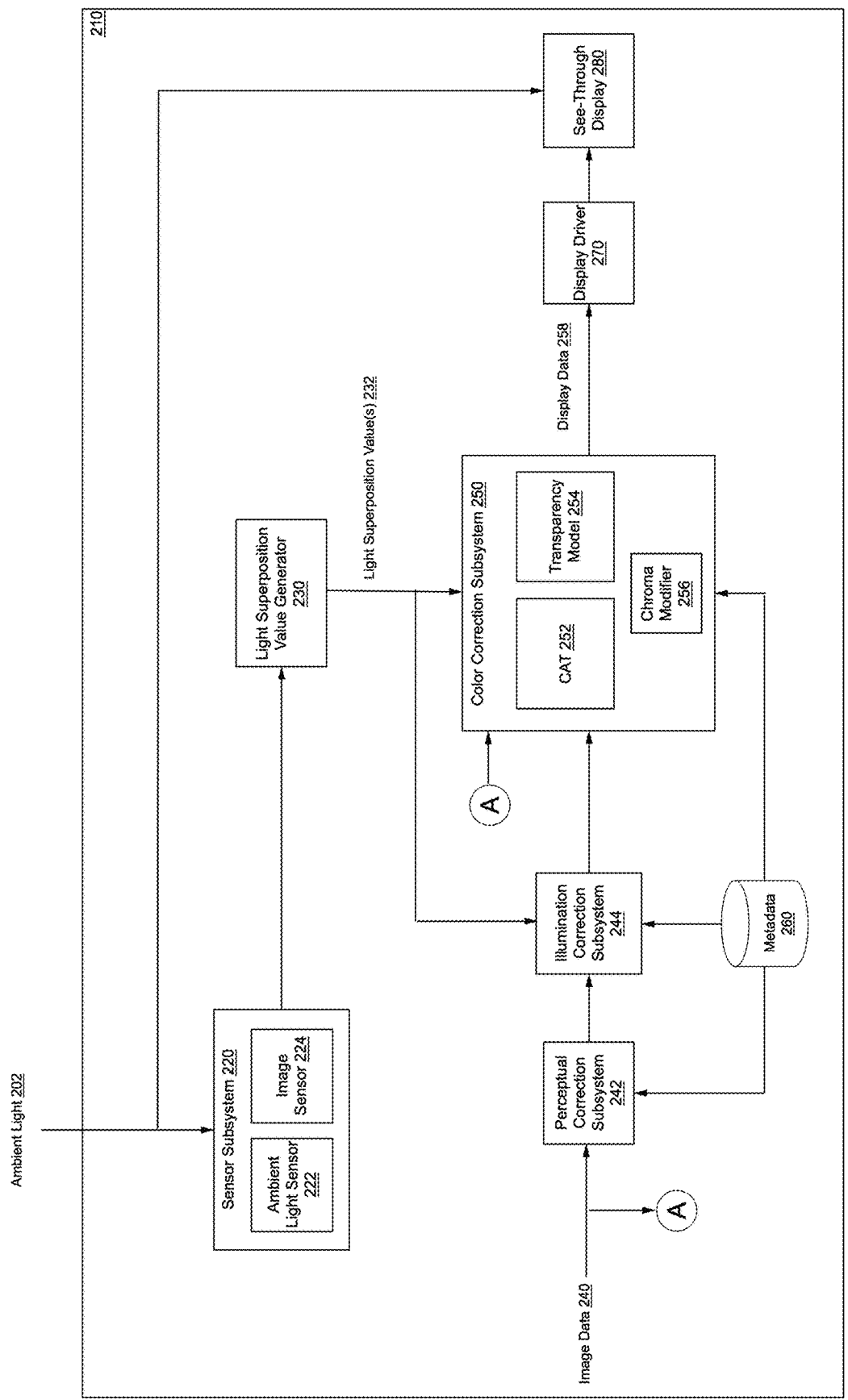
FIG. 2 is an example of a block diagram of a system that performs color correction with respect to image data based on one or more light superposition values in accordance with some implementations.

FIG. 2 is an example of a block diagram of a system 210 that performs color correction with respect to image data 240 based on one or more light superposition values 232 in accordance with some implementations. Namely, according to various implementations, the system 210 includes a color correction subsystem 250 that color corrects the image data 240 based on the light superposition value(s) 232. In various implementations, the system 210 or a portion thereof is integrated in the electronic device 100 illustrated in FIG. 1.

In some implementations, the image data 240 represents computer-generated (e.g., virtual) content, such as a computer-generated object or a computer-generated surface. The image data 240 may represent two-dimensional (2D) content (e.g., heads-up display (HUD) or a mixed reality (MR) image) or three-dimensional (3D) content (e.g., a virtual couch). In some implementations, the image data 240 is stored in a local memory (e.g., a cache or RAM). In some implementations, the system 210 obtains the image data 240 from another system, such as by downloading the image data 240 from a server.

The system 210 includes a see-through display 280. The see-through display 280 displays ambient light 202 from a physical environment as the ambient light 202 is incident on the see-through display 280. In some implementations, the see-through display 280 corresponds to the see-through display 104 in FIG. 1.

The system 210 includes a light superposition value generator 230 that determines the light superposition value(s) 232. The light superposition value(s) 232 characterize the ambient light 202. For example, the light superposition value(s) 232 include one or more chromaticity values, such as a combination of a hue value, chroma value, or a saturation value associated with the ambient light 202. The one or more chromaticity values may provide an objective specification of the quality of colorfulness of the ambient light 202, irrespective of the luminance (e.g., intensity or brightness) of the ambient light 202. As another example, the light superposition value(s) 232 include a luminance value that characterizes the ambient light 202 incident on the see-through display 280 towards eyes of a user. The light superposition value generator 230 determines the light superposition value(s) 232 based on sensor data. To that end, in some implementations, the system 210 includes a sensor subsystem 220 that senses the ambient light 202 and outputs corresponding sensor data. For example, the sensor subsystem 220 includes a combination of an ambient light sensor (ALS) 222 (e.g., a two-dimensional (2D) ALS sensor) and an image sensor 224 (e.g., a camera). The sensor subsystem 220 may include a depth sensor, a visual inertial odometry (VIO) sensor, an inertial measurement unit (IMU), and/or the like.

In some implementations, the light superposition value generator 230 determines a plurality of light superposition values respectively associated with a plurality of regions of the see-through display 280. For example, the plurality of light superposition values includes a first light superposition value that quantifies the ambient light 202 incident on a first region of the see-through display 280. As another example, the plurality of light superposition values includes a second light superposition value that quantifies the ambient light 202 incident on a second region of the see-through display 280. The first region of the see-through display 280 may correspond to a background region, in which color corrected image data is to be displayed. The second region of the see-through display 280 may correspond to a surrounding region that surrounds the background region, such as a region slightly outside the outer perimeter of the first region. For example, with reference to FIG. 8D, the see-through display 280 includes a background region 822 including a color corrected dog 842, and the see-through display includes a surrounding region 824 that surrounds the background region 822. Utilizing a plurality of light superposition values may enable the color correction subsystem 250 to more effectively color correct the image data 240, as will be described below.

According to various implementations, the color correction subsystem 250 color corrects the image data 240 in order to generate display data 258, based on the light superposition value(s) 232. In order to perform the color correction, the color correction subsystem 250 applies one or more color correction functions to the image data 240. In some implementations, the color correction subsystem 250 color corrects the image data 240 on a per-pixel basis in order to generate a corresponding pixel value of display data 258, based on a combination of the first and second light superposition values.

In some implementations, the one or more color correction functions include a chromatic adaptation transform (CAT) 252. The CAT 252 accounts for (e.g., represents or simulates) a visual system's ability to adjust to changes in illumination in order to preserve the appearance of object colors, sometimes referred to as "color constancy." For example, the color correction subsystem 250 detects a change to the light superposition value(s) 232, based on a corresponding change to the ambient light 202 (e.g., dimming or color change of the ambient light 202). Accordingly, the color correction subsystem 250 color corrects the image data 240 in order to generate the display data 258, which, when displayed together with the ambient light 202 on the see-through display 280, satisfies a color constancy threshold indicated by the CAT 252. In some implementations, the CAT 252 includes a combination of linear and non-linear components. For example, in some implementations, the CAT 252 corresponds to or is based on a Von Kries chromatic adaptation, Retinex theory, Nayantani et al. model, MacAdam's model, etc. In some implementations, the CAT 252 is based on a color appearance model. The color appearance model provides perceptual aspects of human color vision, such as the extent to which viewing conditions of a color diverge from the corresponding physical measurement of the stimulus source. For example, the color appearance model is associated with a CIELAB color space. The color appearance model may indicate certain moods or emotions that may result from the viewing of certain colors, such as memory color (e.g., a fire truck is red). For example, the color appearance model provides color harmony principles, such as which colors look good against certain backgrounds ambient light colors.

In implementations in which the image data 240 is at least partially transparent, the one or more color correction functions is based on a transparency model 254. The transparency model 254 models a visual system's perception of the transparent image data 240, based on a function of the light superposition value(s) 232. For example, the color correction subsystem 250 determines a perceived color of the transparent image data 240 by applying the transparency model 254 to the light superposition value(s) 232 and the transparent image data 240. The color correction subsystem 250 color corrects the transparent image data 240 based on a function of the perceived color of the transparent image data 240. For example, the color correction subsystem 250 modifies a hue, chroma, or saturation associated with the transparent image data 240 in order to offset the perceived color of the transparent image data 240.

In some implementations, in order to determine the perceived color of the transparent image data 240, the transparency model 254 performs a weighted sum of a respective color characteristic of the ambient light 202 and a respective color characteristic of the transparent image data 240. For example, the transparency model 254 may correspond to a Metelli Model or a Scission-based model. The transparency model 254 may perform the weighted sum on the luminance (brightness) axis, in isoluminant space, or in a three-dimensional (3D) color space.

In some implementations, the transparency model 254 is a filter-based model that accounts for additive color mixing and subtractive color mixing. For example, the transparency model 254 determines the perceived color of the transparent image data 240 by treating a color characteristic (e.g., chroma or saturation) associated with the transparent image data 240 as a neutral or color filter.

In some implementations, the transparency model 254 is based on a first light superposition value associated with a background region (e.g., the background region 822 in FIG. 8D) of the see-through display 280, wherein the background region includes a display location of color corrected transparent image data 240. For example, the first light superposition value indicates a luminance of the ambient light 202, and the transparency model 254 indicates a reduction in the perceived chroma or saturation of the transparent image data 240 based on a function of the luminance. As one example, the reduction in the perceived chroma or saturation of the transparent image data 240 is proportional to an increase in the luminance of the ambient light 202. As another example, the transparency model 254 indicates a hue shift of the transparent image data 240, based on the first light superposition value indicating a chromaticity value associated with the ambient light 202. For example, the chromaticity value and a respective chromaticity value of the color corrected transparent image data 240 together satisfy a color contrast criterion, such as by being on opposite sides of the color wheel. Accordingly, the color correction subsystem 250 may shift the hue of the transparent image data 240 in order to offset a hue shift caused by the ambient light 202.

In some implementations, the one or more color correction functions include a chroma modifier 256. The chroma modifier 256 color corrects the image data 240 by modifying (e.g., boosting or reducing) a first chroma value, which is associated with the image data 240, to a second chroma value associated with the display data 258. To that end, in some implementations, the chroma modifier 256 determines the second chroma value based on the light superposition value(s) 232 and a color characteristic vector associated with the image data 240. For example, the light superposition value(s) 232 indicate a luminance (e.g., brightness) characteristic associated with the ambient light 202. As another example, the color characteristic vector includes a combination of the first chroma value associated with the image data 240 and a first hue value associated with the image data 240. In some implementations, the chroma modifier 256 color corrects the image data 240 further based on a color appearance model. Accordingly, concurrent display of the color corrected image data 240 (the display data 258) and the ambient light 202 appears more vivid than concurrent display of uncorrected image data 240 and the ambient light 202.

In some implementations, the color correction subsystem 250 further color corrects the image data 240 based on a function of metadata 260. For example, the metadata 260 indicates a use case or a user preference. As one example, the user preference indicates a user's desired brightness level or color composition. As another example, the metadata 260 is indicative of an application type associated with the image data 240. As yet another example, the metadata 260 is indicative of an object type (e.g., living object versus inanimate object) represented by the image data 240, object of interest (e.g., popular object or avatar) represented by the image data 240, etc. Examples of color correction based on the metadata 260 are provided below.

In some implementations, the system 210 includes a perceptual correction subsystem 242 that performs perceptual correction on the image data 240. In some implementations, the system 210 provides the output of the perceptual correction subsystem 242 directly to the color correction subsystem 250. In some implementations, the system 210 provides the output of the perceptual correction subsystem 242 to an illumination correction subsystem 244. According to various implementations, the perceptual correction subsystem 242 performs perceptual correction based on one or more perceptual criteria. In some implementations, the one or more perceptual criteria are based on a function of visual phenomena associated a spectral characteristic associated with the image data 240. For example, the one or more perceptual criteria are based on proximity, similarity, figureground, continuity, closure, and connection. In some implementations, the perceptual correction subsystem 242 performs perceptual correction as a function of the metadata 260.

In some implementations, the system 210 includes an illumination correction subsystem 244. The illumination correction subsystem 244 performs illumination correction on the image data 240, based on the light superposition value(s) 232. The system 210 provides the output of the illumination correction subsystem 244 to the color correction subsystem 250. For example, the illumination correction corresponds to white point correction. As another example, the illumination correction subsystem 244 uses a CAT to perform the illumination correction, such as via a diagonal transform using a 3×3 matrix, 3×5 matrix, or 3×6 matrix. In some implementations, the illumination correction subsystem 244 performs illumination correction as a function of the metadata 260.

The see-through display 280 displays the ambient light 202 and the display data 258. In some implementations, the system 210 includes a display driver 270 that drives the see-through display 280 with the display data 258 from the color correction subsystem 250. For example, the display driver 270 drives the see-through display 280 based on a function of a dimensional characteristic (e.g., resolution, area) associated with the see-through display 280. As another example, the display driver 270 drives the see-through display 280 based on a function of a gamut associated with the see-through display 280.

Figure 3:
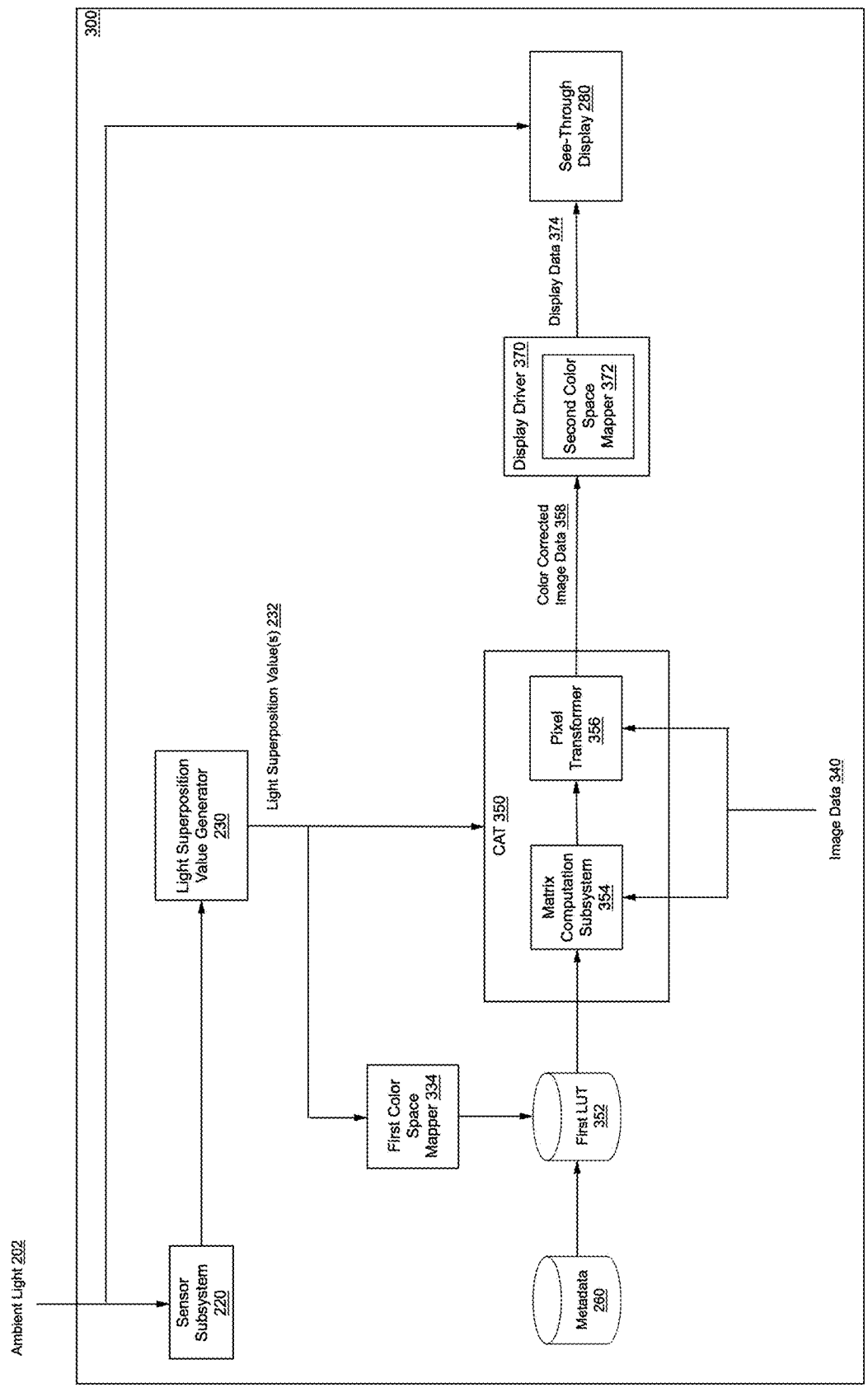
FIG. 3 is an example of a block diagram of a system that performs a chromatic adaptation transform (CAT) in order to color correct image data in accordance with some implementations.

FIG. 3 is an example of a block diagram of a system 300 that performs a chromatic adaptation transform (CAT) 350 in order to color correct image data 340 in accordance with some implementations. In some implementations, the CAT 350 is similar to and adapted from the CAT 252 in FIG. 2. In some implementations, the image data 340 corresponds to the image data 240 in FIG. 2.

The system 300 may operate across different color spaces, including but not limited to RGB space, XYZ space, IPT space, xyY space, and LMS space. For example, in some implementations, the system 300 includes a first color space mapper 334 that maps the light superposition value(s) 232 from XYZ space to IPT space or xyY space. The first color space mapper 334 provides the mapped output to a first lookup table (LUT) 352, the operation of which will be described below. As another example, in some implementations, the system 300 includes a display driver 370 that includes a second color space mapper 372. The second color space mapper 372 maps color corrected image data 358 from LMS space to RGB space to generate display data 374, which is displayable on the see-through display 280.

The CAT 350 includes a matrix computation subsystem 354 that determines a color correction matrix (CCM) based on a function of the light superposition value(s) 232. For example, the matrix computation subsystem 354 determines the CCM based on color constancy principles and/or a color appearance model, as is described with reference to the CAT 252 in FIG. 2. In some implementations, the CCM is further based on a chromatic adaptation degree value. For example, the matrix computation subsystem 354 retrieves the chromatic adaptation degree value from the first LUT 352. The chromatic adaptation degree value may be based on the metadata 260. For example, when the metadata 260 indicates a user preference for high saturation (e.g., bright) colors, the matrix computation subsystem 354 determines a CCM, which, when applied to the image data 340, results in relatively bright color corrected image data 358.

The CAT 350 includes a pixel transformer 356 that applies the CCM to the image data 340 in order to generate the color corrected image data 358. For example, the pixel transformer 356 diagonally transforms, via the CCM, a first chroma value associated with the image data 340 in order to determine a second chroma value associated with the color corrected image data 358. The pixel transformer 356 may use a CIE standard CAT16 or a similar diagonal transform in order to adapt the hue and/or chroma of the image data 340. The diagonal matrix is 3×3 or 3×9 or another appropriate size.

According to various implementations, the CAT 350 color corrects the image data 340 in LMS space. LMS is a color space that represents the response of the three types of cones of the human eye, based on the eye's responsivity (e.g., sensitivity) peaks at long, medium, and short wavelengths (LMS). For example, the pixel transformer 356 transforms the image data 350 according to a Von Kries chromatic adaptation.

The system 300 provides the color corrected image data 358 to a display driver 370, which drives the see-through display 280 with display data 374. The display data 374 may be based on the color corrected image data 358 and on characteristics (e.g., gamut, display size) associated with the see-through display 280. In implementations in which the CAT 350 operates in LMS space, the display driver 374 maps, via the second color space mapper 372, the LMS data to RGB data for display on the see-through display 280.

Figure 4:
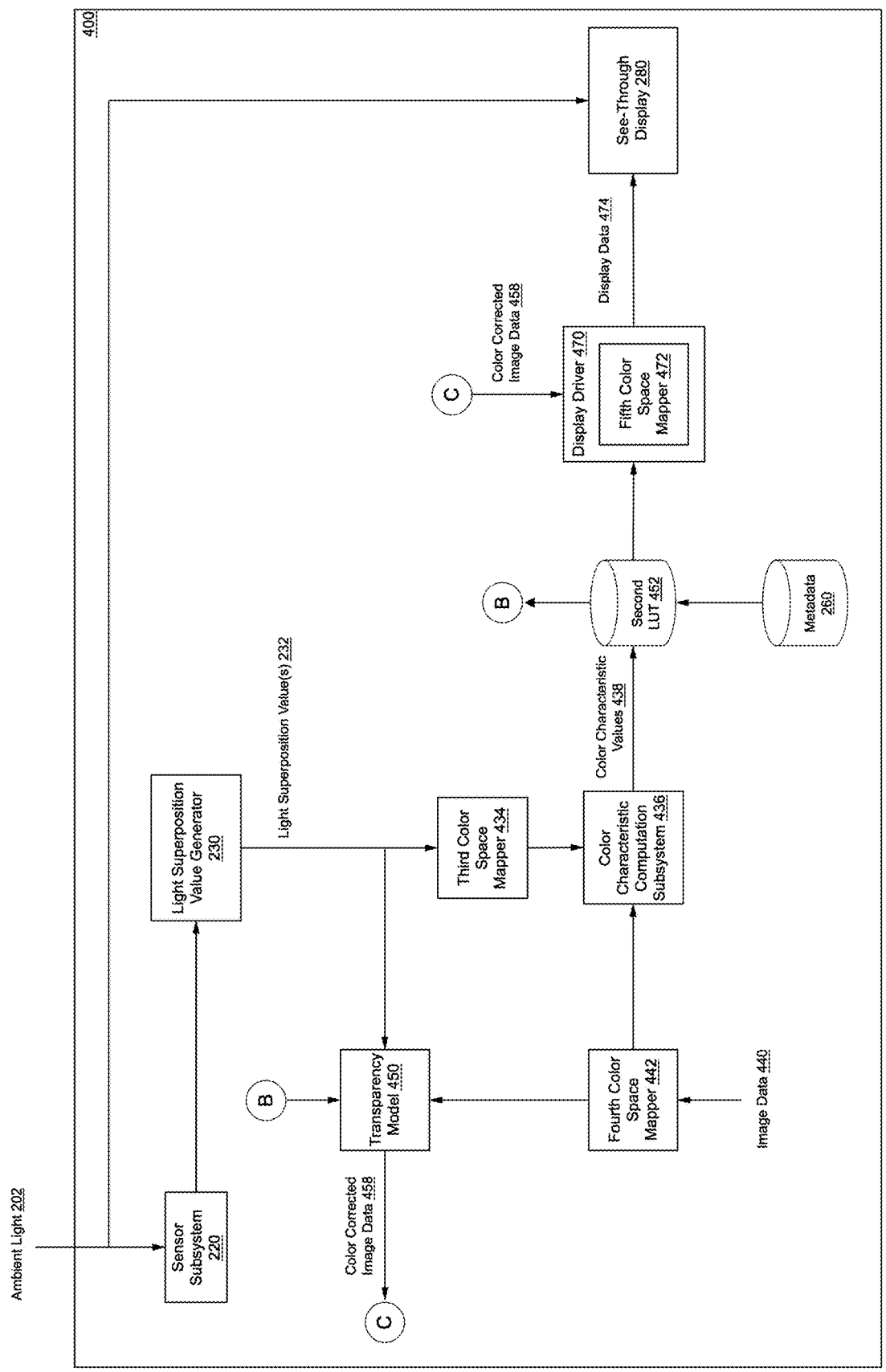
FIG. 4 is an example of a block diagram of a system that utilizes a transparency model in order to color correct image data in accordance with some implementations.

FIG. 4 is an example of a block diagram of a system 400 that utilizes a transparency model 450 in order to color correct image data 440 in accordance with some implementations. The image data 440 is at least partially transparent, and the ambient light 202 may adversely affect the appearance of the image data 440 displayed on the see-through display 280. For example, ambient light 202 that is incident on a background region of the see-through display 280 (where the displayed image 440 is located) is partially viewable through the displayed image data 440 and thus adversely affects the appearance of the displayed image data 440. As another example, when the ambient light 202 is associated with a respective luminance value that is a threshold amount higher than a respective luminance value associated with the image data 440, the image data 440 may be difficult for a user to perceive on the see-through display 280. As yet another example, when the ambient light 202 is associated with a respective chromaticity value that satisfies a color contrast threshold with respect to a respective chromaticity value associated with the image data 440, the color profile of the displayed image data 440 may be adversely affected. As one example, when the image data 440 is white and the ambient light 202 is green, the displayed image data 400 may appear to have a greenish tint.

Accordingly, the system 400 color corrects the image data 440 by providing the light superposition value(s) 232 to the transparency model 450, wherein the light superposition value(s) 232 characterize the ambient light 202. Further to this end, the system 400 provides computed color characteristic values 438 (e.g., hue value and saturation value) from a second lookup table (LUT) 452 to the transparency model 450, as will be described below.

The system 400 includes a color characteristic computation subsystem 436 that computes various color characteristic values 438 associated with the image data 440, based on the light superposition value(s) 232. In some implementations, the color characteristic values 438 include a hue value associated with the image data 440. In some implementations, the color characteristic values 438 include a relative hue value that characterizes the hue value associated with the image data 440 relative to a hue value associated with the light superposition value(s) 232. In some implementations, the color characteristic values 438 include a relative saturation value that characterizes a saturation value associated with the image data 440 relative to a saturation value associated with the light superposition value(s) 232. In some implementations, the color characteristic values 438 include a combination of the aforementioned values. In some implementations, the system 400 includes a third color space mapper 434 that maps the light superposition value(s) 232 from XYZ space to IPT space or to xyY space, and provides the mapped result to the color characteristic computation subsystem 436. The system 400 provides the color characteristic values 438 to the second LUT 452.

In some implementations, the second LUT 452 stores the metadata 260. The transparency model 450 may use the metadata 260, in conjunction with the color characteristic values 438, to color correct the image data 440. In some implementations, the metadata 260 indicates a particular object of interest or user preference. For example, the transparency model 450 color corrects a particular portion of the image data 440, which represents the particular object, in order to satisfy a perceptual criterion. Continuing with this example, the transparency model 450 color corrects the particular portion of the image data 440 such that the resulting portion of the color corrected image data 458 appears to have a threshold amount of saturation contrast or hue contrast when compared with the ambient light 202 incident on a corresponding region of the see-through display 280.

Based on the color characteristic values 438 and the light superposition value(s) 232, the transparency model 450 generates color corrected image data 458 from the image data 440. For example, the color characteristic values 438 include a relatively high hue contrast value, which characterizes a relatively large difference between a respective hue associated with the light superposition value(s) 232 and a respective hue associated with the image data 440. Continuing with this example, an electronic device is pointed at green grass corresponding to a green hue ambient light 202, and the image data 440 is associated with a predominantly purple hue. Accordingly, the transparency model 450 may modify the image data 440 such that the color corrected image data 458, when compared against the light superposition value(s) 232, has a lower hue contrast value (e.g., closer on the color wheel). In some implementations, the transparency model 450 is similar to and adapted from the transparency model 254 in FIG. 2. For example, the transparency model 450 corresponds to a Metelli model, Scission model, or a filter-based model.

In some implementations, the system 400 includes a display driver 470, which transforms the color corrected image data 458 into display data 474. The see-through display 280 displays the display data 474 and the ambient light 202. For example, the display driver 470 modifies the color corrected image data 458 based on a gamut associated with the see-through display 280.

The system 400 may operate across different color spaces, including but not limited to RGB space, XYZ space, IPT space, and xyY space. For example, in some implementations, the third color space mapper 434 maps the light superposition value(s) 232 from XYZ space to IPT space or to xyY space, and provides the mapped result to the color characteristic computation subsystem 436. As another example, in some implementations, the system 400 includes a fourth color space mapper 442 that maps the image data 440 from RGB space to IPT space or to xyY space, and provides the mapped result to the color characteristic computation subsystem 436. As yet another example, in some implementations, the display driver 470 includes a fifth color space mapper 472 that maps the color corrected image data 458 from IPT space to a RGB space displayable by the see-through display 280. In some implementations, the fifth color space mapper 472 maps the color corrected image data 458 from xyY space to the RGB space.

Figure 5:
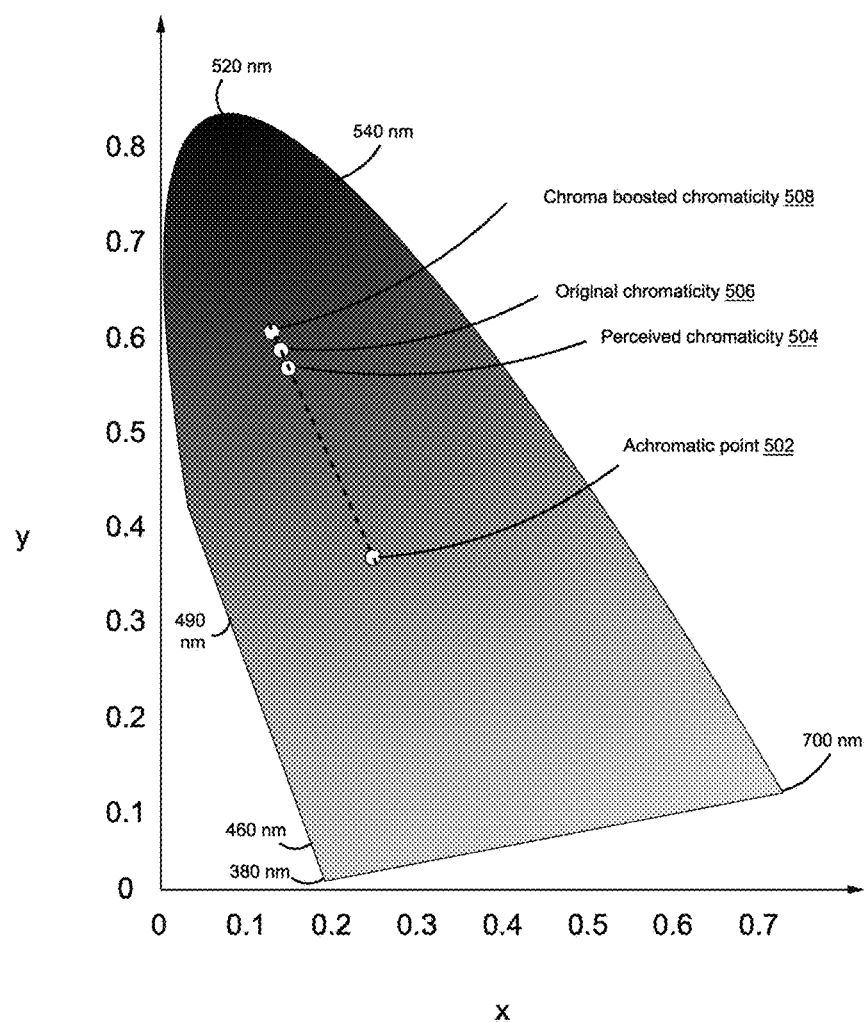
FIG. 5 is an example of a first chromaticity diagram associated with chroma boosting in accordance with some implementations.

FIG. 5 is an example of a first chromaticity diagram 500 associated with chroma boosting in accordance with some implementations. The first chromaticity diagram 500 indicates a relationship between wavelength values (in the electromagnetic visible spectrum) and perceived colors in human color vision. For example, the first chromaticity diagram 500 represents the CIE 1931 xy chromaticity space. Various wavelength values are indicated in the first chromaticity diagram 500, including 520 nm, 700 nm, 380 nm, etc. An achromatic point 502 in the xy chromaticity space is illustrated for reference.

According to various implementations, the first chromaticity diagram 500 characterizes the operation of the system 210, and specifically the operation of the chroma modifier 256, described with reference to FIG. 2. For example, the chroma modifier 256 boosts a first chroma value associated with the image data 240 in order to arrive at a second chroma value. The second chroma value is associated with the display data 258.

To that end, referring back to FIG. 5, the system 210 may determine a perceived chromaticity 504 associated with the image data 240. The perceived chromaticity 504 corresponds to a perceived chromaticity of the displayed (uncorrected) image data 240 on the see-through display 280 while the ambient light 202 is incident on the see-through display 280. In some implementations, the system 210 determines the perceived chromaticity 504 based on a function of an original (e.g., uncorrected) chromaticity 506 of the image data 240 and the light superposition value(s) 232. The original chromaticity 506 corresponds to an objective specification of the quality of a color of the image data 240, independent of a luminance of the image data 240. In some implementations, the system 210 applies a color appearance model to the original chromaticity 506 and the light superposition value(s) 232 in order to determine the perceived chromaticity 504.

The chroma modifier 256 boosts the perceived chromaticity 504 in order to determine a chroma boosted chromaticity 508, which is associated with the display data 258. Accordingly, the chroma boosted chromaticity 508 accounts for the ambient light 202 incident on the see-through display 280. Thus, display of the display data 258 on the see-through display 280 appears more vivid than a display of the (uncorrected) image data 240 on the see-through display 280.

Figure 6:
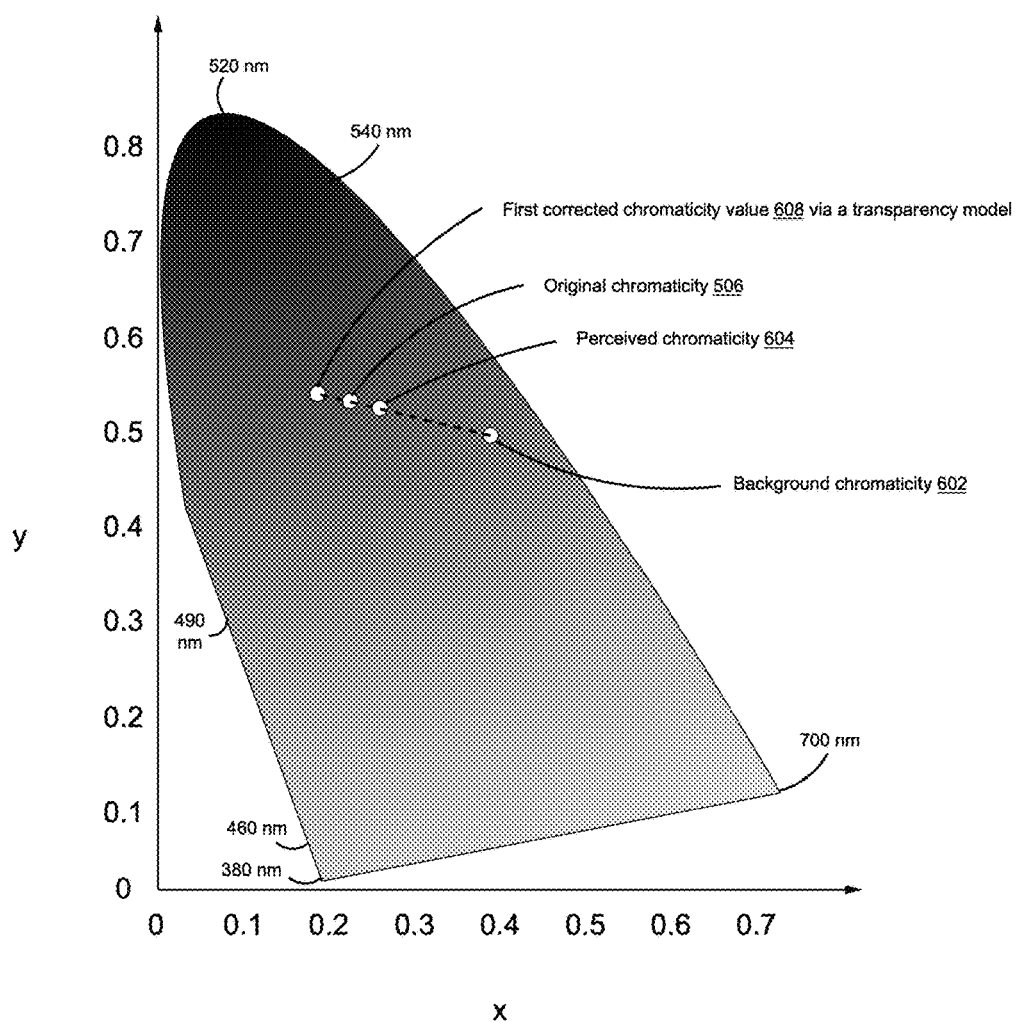
FIG. 6 is an example of a second chromaticity diagram associated with utilization of a transparency model in accordance with some implementations.

FIG. 6 is an example of a second chromaticity diagram 600 associated with utilization of a transparency model in accordance with some implementations. Similar to the first chromaticity diagram 500, the second chromaticity diagram 600 indicates a relationship between wavelength values (in the electromagnetic visible spectrum) and perceived colors in human color vision. In some implementations, the transparency model corresponds to the transparency model 254 in FIG. 2 or the transparency model 450 in FIG. 4. According to various implementations, the second chromaticity diagram 600 characterizes color correction performed by the system 210 or the system 400.

As one example, with reference to FIG. 2, the system 210 may determine a perceived chromaticity 604 associated with partially transparent image data 240. The perceived chromaticity 604 corresponds to a chromaticity of the displayed (uncorrected) partially transparent image data 240 on the see-through display 280 while the ambient light 202 is incident on the see-through display 280. For example, the system 210 determines the perceived chromaticity 604 based on the original chromaticity 506 associated with the partially transparent image data 240 and a background chromaticity 602 associated with the ambient light 202. The background chromaticity 602 is indicated by the light superposition value(s) 232. The background chromaticity may be associated with a background region of the see-through display 280, such as the background region 822 in FIG. 8D. The color correction subsystem 250 determines, via the transparency model 254, a first corrected chromaticity value 608 based on the perceived chromaticity 604. Moreover, the color correction subsystem 250 generates display data 258 associated with the first corrected chromaticity value 608. For example, based on a high saturation difference between the partially transparent image data 240 and the ambient light 202, the first corrected chromaticity value 608 is higher than a saturation level associated with the partially transparent image data 240. Accordingly, the generated display data 258, when displayed along with the ambient light 202 on the see-through display 280, appears more vivid.

Figure 7:
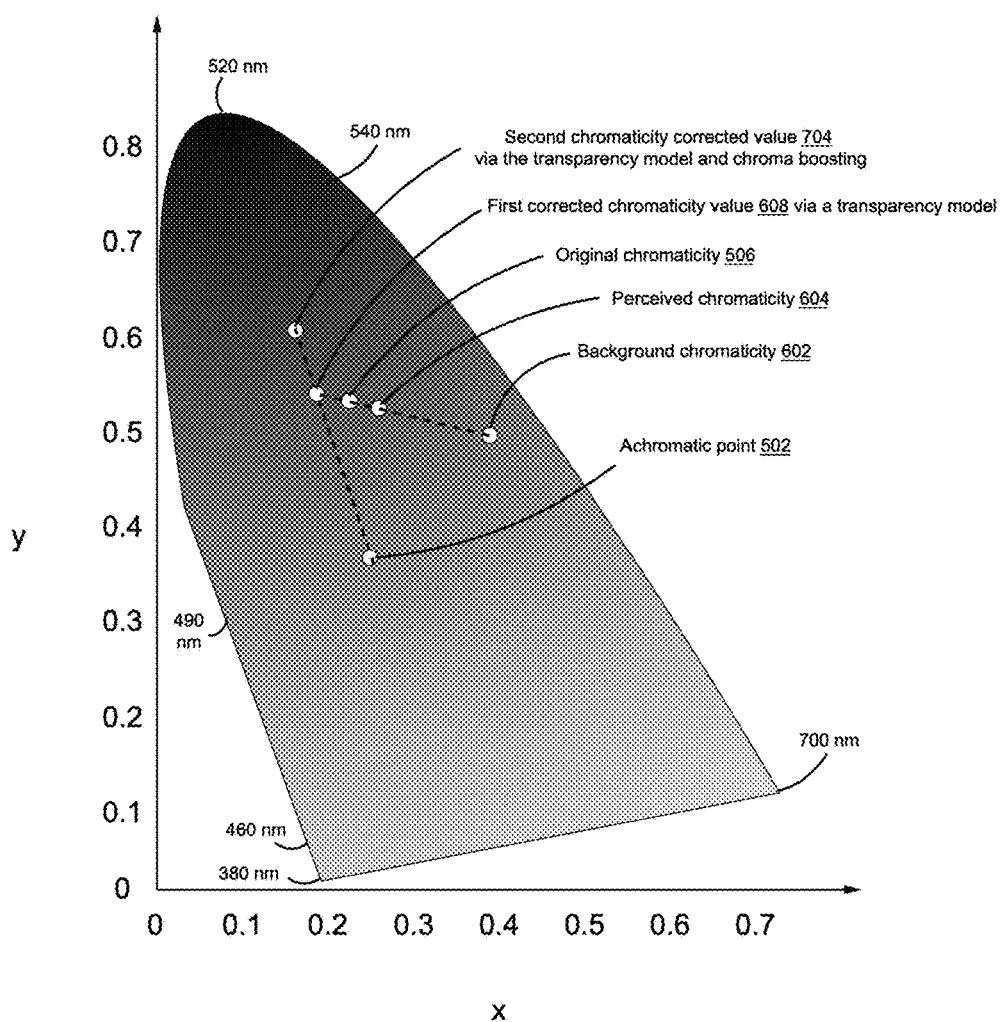
FIG. 7 is an example of a third chromaticity diagram associated with utilization of a combination of chroma boosting and a transparency model in accordance with some implementations.

FIG. 7 is an example of a third chromaticity diagram 700 associated with utilization of a combination of chroma boosting and a transparency model in accordance with some implementations. Similar to the first chromaticity diagram 500, the third chromaticity diagram 700 indicates a relationship between wavelength values (in the electromagnetic visible spectrum) and perceived colors in human color vision. According to some implementations, the third chromaticity diagram 700 characterizes color corrected performed by the system 210 or the system 400. For example, as described with reference to FIG. 6, the system 210 determines the first corrected chromaticity value 608 based on the perceived chromaticity 604. Moreover, with reference to FIG. 5, the system 210 performs chroma boosting via the chroma modifier 256, in order to boost the first corrected chromaticity value 608 to a second corrected chromaticity value 704. The system 210 may generate display data 258 associated with the second corrected chromaticity value 704. The generated display data 258, when displayed along with the ambient light 202 on the see-through display 280, appears more vivid and appears enhanced under a given luminance characteristic associated with the ambient light 202.

FIGS. 8A-8D are an example of per-pixel color correction of image data 802 based on a combination of first and second light superposition values in accordance with some implementations. In various implementations, the color correction is performed by the system 210 in FIG. 2, the system 300 in FIG. 3, or the system 400 in FIG. 4.

Figure 8A:
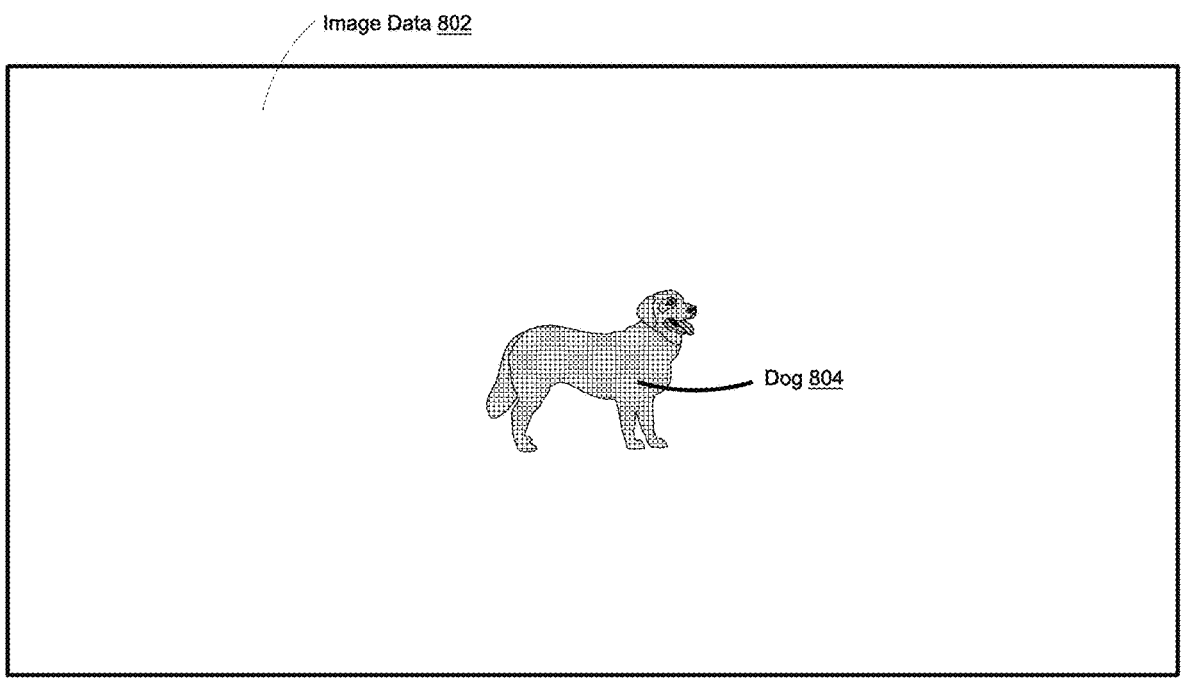
FIGS. 8A-8D are an example of per-pixel color correction of image data based on a combination of first and second light superposition values in accordance with some implementations.

As illustrated in FIG. 8A, the image data 802 represents a dog 804. The dog 804 includes plurality of pixel values (e.g., RGB values). The plurality of pixel values is associated with a plurality of color characteristic vectors. For example, a particular pixel value is characterized by a corresponding color characteristic vector, which includes a combination of a hue value, a saturation value, a chrome value, a luminance value, etc. The plurality of color characteristic vectors is represented by a cross-hatched pattern in FIG. 8A.

Figure 8B:
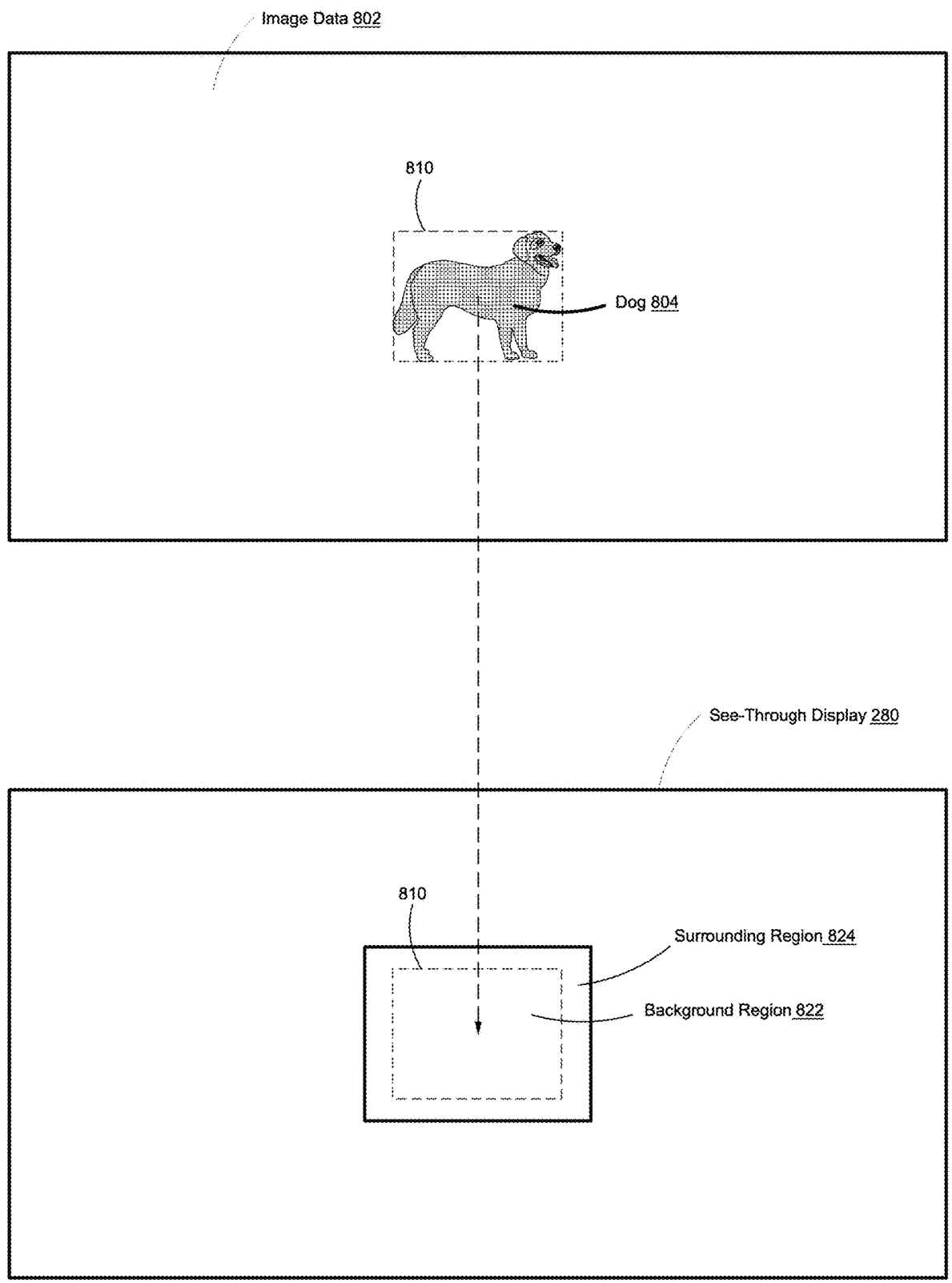

As illustrated in FIG. 8B, the see-through display 280 includes a background region 822 and a surrounding region 824. The background region 822 corresponds to a position 810 at which the dog 804 is to be displayed. In other words, the background region 822 corresponds to a background region relative to the dog 804. The surrounding region 824 corresponds to the region that surrounds the background region 822.

Figure 8C:
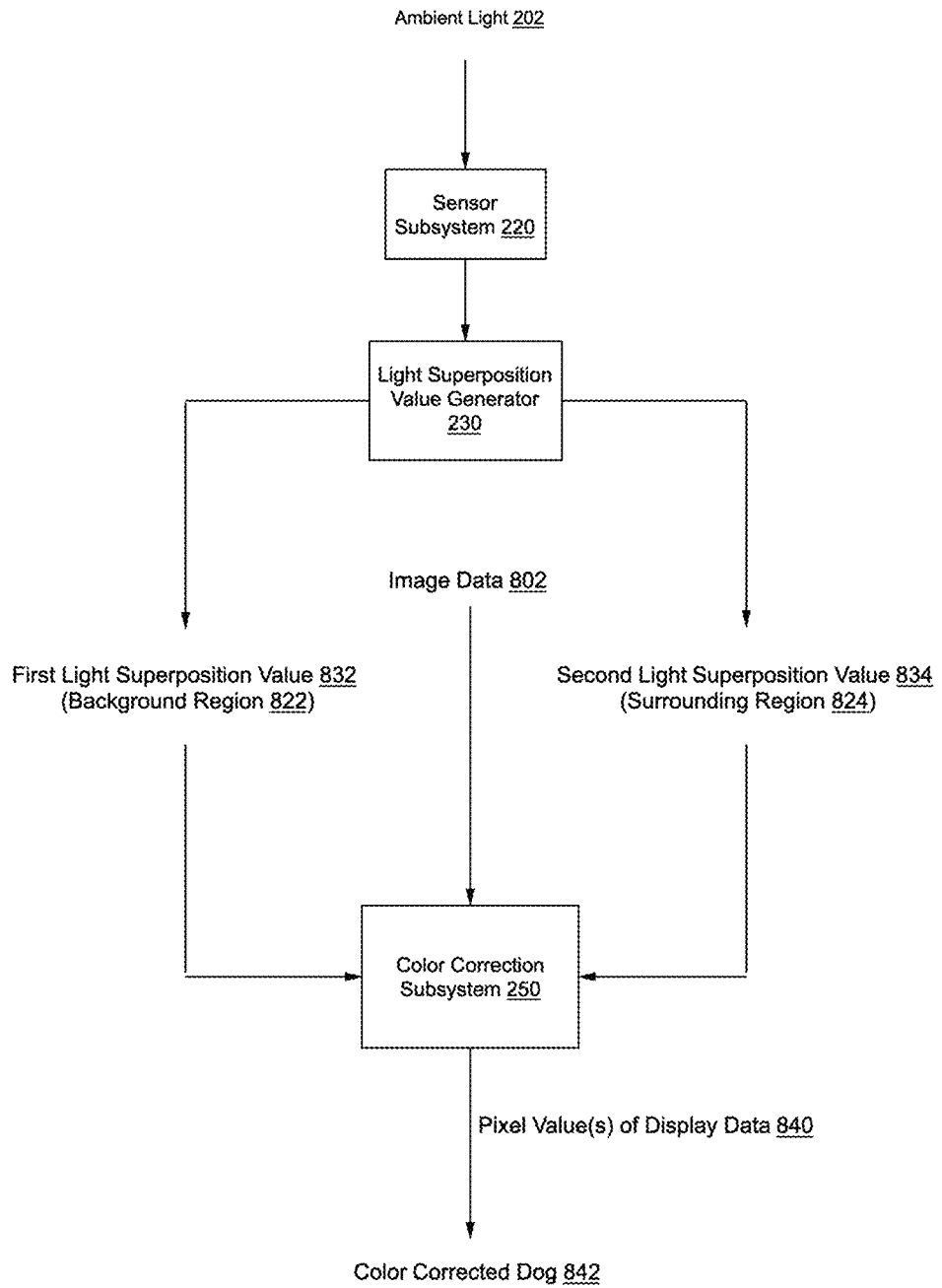

Ambient light incident on the see-through display 280 may adversely affect display of the dog 804. Accordingly, as disclosed by various implementations herein, a system performs color correction based on a function of a characteristic associated with the ambient light. Namely, as illustrated in FIG. 8C, the light superposition value generator 230 determines, based on sensor data from the sensor subsystem 220, a first light superposition value 832 and a second light superposition value 834. The first light superposition value 832 characterizes ambient light 202 incident on the background region 822, and the second light superposition value 834 characterizes ambient light 202 incident on the surrounding region 824.

The color correction subsystem 250 modifies one or more pixel values associated with the image data 802, via a color correction function, in order to generate a corresponding one or more pixel values of display data 840. The color correction function is based on a combination of the first and second light superposition values (832 and 834). As one example, in some implementations, the color correction subsystem 250 provides the first light superposition value 832 and a first pixel value of the image data 802 to a CAT in order to generate a corresponding first pixel value of the display data 840. As another example, in some implementations, the color correction subsystem 250 provides the first light superposition value 832 and a first pixel value of the image data 802 to a transparency model in order to generate a corresponding first pixel value of the display data 840. As yet another example, in some implementations, the color correction subsystem 250 determines a color induction value associated with a first pixel value of the image data 802 based on the second light superposition value 834, and uses the color induction value in order to generate a corresponding first pixel value of the display data 840.

Figure 8D:
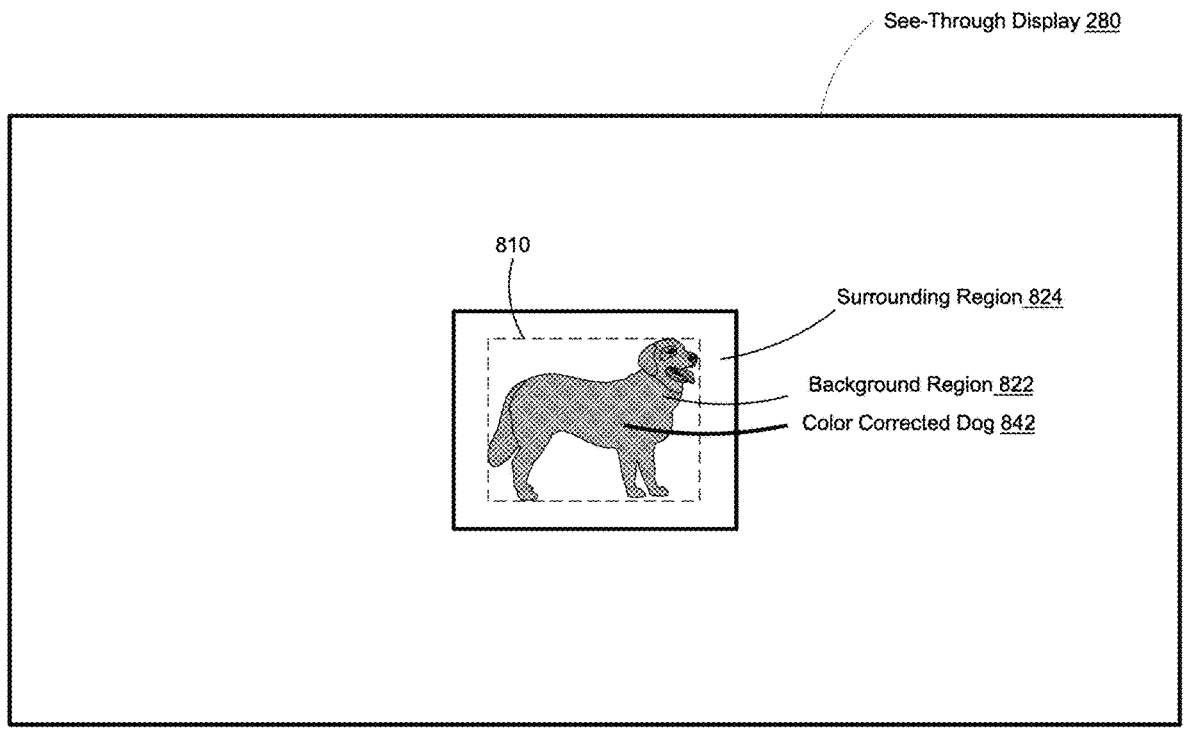

As illustrated in FIG. 8D, the see-through display 208 displays display data representing a color corrected dog 842. In contrast with the cross-hatched pattern associated with the dog 804 in FIG. 8A, the color corrected dog 842 is associated with a different, diagonal pattern. The diagonal pattern indicates the color correction performed by color correction subsystem 250. For example, as compared with the dog 804, the color corrected dog 842 is associated with a different chroma value (e.g., chroma boosting), different saturation value, or different hue value.

Figure 9:
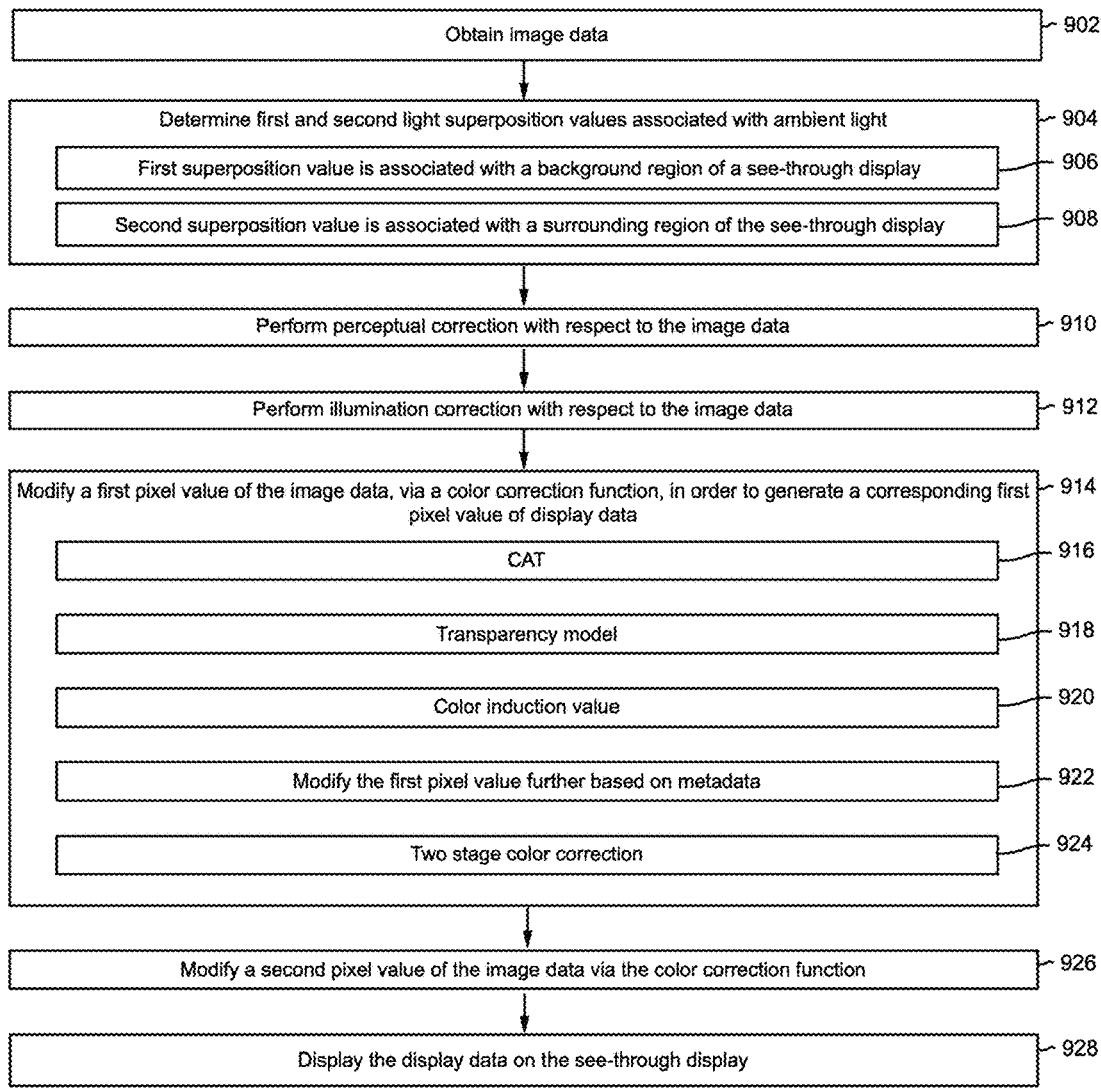
FIG. 9 is an example of a flow diagram of a method of performing per-pixel color correction of image data based on a combination of first and second light superposition values in accordance with some implementations.

FIG. 9 is an example of a flow diagram of a method 900 of performing per-pixel color correction of image data based on a combination of first and second light superposition values in accordance with some implementations. In various implementations, the method 900 or portions thereof are performed by an electronic device including a see-through display (e.g., the electronic device 100 in FIG. 1). In various implementations, the method 900 or portions thereof are performed by the system 210, the system 300, or the system 400. In various implementations, the method 900 or portions thereof are performed by a head-mountable device (HMD) including a see-through display. In some implementations, the method 900 is performed by processing logic, including hardware, firmware, software, or a combination thereof. In some implementations, the method 900 is performed by a processor executing code stored in a non-transitory computer-readable medium (e.g., a memory).

As represented by block 902, in some implementations, the method 900 includes obtaining image data (e.g., the image data 240 in FIG. 2, the image data 340 in FIG. 3, or the image data 440 in FIG. 4). In some implementations, the image data represents computer-generated content, such as a computer-generated object or a computer-generated surface. The image data may represent two-dimensional (2D) content (e.g., heads-up display (HUD) or mixed reality (MR) image) or three-dimensional (3D) content (e.g., a virtual couch).

As represented by block 904, the method 900 includes determining first and second light superposition values that are associated with ambient light from a physical environment. In various implementations, the method 900 includes determining the first and second light superposition values based on sensor data. For example, with reference to FIG. 2, the sensor subsystem 220 outputs ambient light sensor data and/or image sensor data, and the light superposition value generator 230 determines the first and second light superposition values based on the sensor data. Other examples of sensor data include visual inertial odometry (VIO) data and inertial measurement unit (IMU) data. As another example, with reference to FIG. 8C, the light superposition value generator 230 determines the first light superposition value 832 (associated with the background region 822) and the second light superposition value 834 (associated with the surrounding region 824). A light superposition value characterizes the ambient light incident on a see-through display. For example, a light superposition value corresponds to one or more chromaticity values, such as a combination of a hue value, chroma value, saturation value, etc. associated with the ambient light. The one or more chromaticity values may provide an objective specification of the quality of a color of the ambient light, irrespective of the luminance (e.g., intensity or brightness) of the ambient light. As another example, a light superposition value corresponds to a luminance value, which indicates the luminous intensity per unit area of the ambient light incident on the see-through display. A particular light superposition value may indicate chromaticity and luminance of the ambient light.

The first light superposition value quantifies the ambient light incident on a first region of the see-through display. In some implementations, as represented by block 906, the first region corresponds to a background region, such as the background region 822 in FIG. 8B. The second light superposition value quantifies the ambient light incident on a second region of the see-through display. In some implementations, as represented by block 908, the second region corresponds to a surrounding region, such as the surrounding region 824 in FIG. 8B. In some implementations, the dimensions of the second region depend on the type of image data, type of physical environment (e.g., indoor vs outdoor), and user preference.

As represented by block 910, in some implementations, the method 900 includes performing perceptual correction on the image data based on one or more perceptual criteria. For example, as described with reference to FIG. 2, the perceptual correction subsystem 242 performs the perceptual correction. In some implementations, the one or more perceptual criteria are based on a function of visual phenomena associated a spectral characteristic associated with the image data. In some implementations, the one or more perceptual criteria are based on a color appearance model. As one example, the one or more perceptual criteria are based on proximity, similarity, figure-ground, continuity, closure, and connection.

As represented by block 912, in some implementations, the method 900 includes performing illumination correction on the image data, based on a combination of the first and second light superposition values. For example, as described with reference to FIG. 2, the illumination correction subsystem 244 performs the illumination correction. In some implementations, the illumination correction corresponds to a white point correction. In some implementations, the method 900 includes using a CAT to perform the illumination correction, such as a diagonal transform using a 3×3 matrix, 3×5 matrix, or 3×6 matrix.

As represented by block 914, the method 900 includes modifying a first pixel value of image data, via a color correction function, in order to generate a corresponding first pixel value of display data. The color correction function is based on a combination of the first and second light superposition values. Various examples of the color correction function are described with reference to FIG. 2.

In some implementations, as represented by block 916, the color correction function modifies the first pixel value of image data via a chromatic adaption transform (CAT) based on the first light superposition value associated with the background region. Color correction via a CAT is described with reference to the CAT 252 in FIG. 2 and the CAT 350 in FIG. 3. Examples of the CAT include a Von Kries chromatic adaption, Retinex theory, Nayantani et al. model, MacAdam's model, etc. In some implementations, the CAT utilizes a color correction matrix (CCM), and the method 900 includes generating the corresponding first pixel value of display data includes diagonally transforming the first pixel value of image data via the CCM. The CCM may be a 3×3, 3×5, or 3×6 matrix. In some implementations, the matrix computation subsystem 354 illustrated in FIG. 3 computes the CCM. In some implementations, the method 900 includes using a CIE standard CAT16 or a similar diagonal transform to adapt the hue and chroma of the image data in order to perform the CAT. The CAT may operate in long, medium, short (LMS) color space.

In some implementations, as represented by block 918, the color correction function modifies the first pixel value of image data via a transparency model, based on the first light superposition value associated with the background region. Color correction via the transparency model is described with reference to the transparency model 254 in FIG. 2 and the transparency model 450 in FIG. 4. Examples of the transparency model include a Metelli model, Scission based model, additive/subtractive models, filter based models, etc.

In some implementations, the color correction function modifies the first pixel value of image data, via a CAT and a transparency model, based on the first light superposition value associated with the background region.

In some implementations, as represented by block 920, the method 900 includes modifying the first pixel value of image data based on a function of a color induction value associated with the first pixel value of image data. To that end, the method 900 includes determining the color induction value, based on a function of the second light superposition value associated with the surrounding region. In some implementations, the method 900 includes determining the color induction value via a color contrast induction model. For example, the color contrast induction model implements Kirschmann's fourth law, as extended to chromatic colors. The color induction value may indicate a perceived color shift value associated with the first pixel value of image data.

In some implementations, the color induction value indicates a direction of color induction. For example, the direction of color induction is away from a respective chromaticity value associated with the second light superposition value and towards a respective chromaticity value associated with the first pixel value of image data. As another example, the direction of color induction depends on both the color of the surround and the color of the target. The color of a target may be displaced away from the color of the surround along the path of the line formed between the surround color and the target color. In some implementations, the direction of color induction satisfies a complementary criterion with respect to a respective chromaticity value associated with the second light superposition value. For example, according to the complementary law, if the color of the surrounding region is red, then the direction of induction is towards green, and vice versa. In another example, if the color of the surrounding is blue, then the direction of induction is towards yellow, and vice versa. In some implementations, the method 900 includes using the complementary law in order to adapt the color of the first pixel value of image data, depending on the color of the surrounding region. Accordingly, under color induction, the difference between the perceived color of a color corrected pixel value and the original color value is less a threshold.

In some implementations, as represented by block 922, the color correction function is further based on metadata that is associated with the image data. For example, the metadata is indicative of a use case or a user preference (e.g., desired brightness level of color composition. As another example, the metadata is indicative of one or more of an application type associated with the image data, object type (e.g., living object) represented by the image data, object of interest (e.g., popular object or an avatar) represented by the image data, etc. Various examples of utilizing the metadata 260 for color correction are provided with reference to FIGS. 3 and 4.

In some implementations, as represented by block 924, the method 900 includes performing two stage color correction. To that end, the method 900 includes determining a first color corrected pixel value based on the first pixel value and the first light superposition value, determining a second color corrected pixel value based on the first color corrected pixel value and the second light superposition value, and generating the corresponding first pixel value of the display data based on a combination of the first and second color corrected pixel values. For example, the first color corrected pixel value is a modified chroma/hue of the first pixel value, based on ambient associated with the background region. As another example, the second color corrected pixel value is a modified chroma/hue of the first color corrected pixel value, based on ambient light associated with the surrounding region. In some implementations, generating the corresponding first pixel value of the display data is based on a weighted average of the first and second color corrected pixel values. For example, the first and/or second light superposition values are weighted with an appropriate function (e.g., Gaussian or other statistical operation) when computing the size of the visual effect caused by the ambient light incident on the first and the second regions.

In some implementations, as represented by block 926, the method 900 includes modifying a second pixel value of the image data, via the color correction function, in order to generate a corresponding second pixel value of the display data, based on a function of the first and second light superposition values.

As represented by block 928, the method 900 includes displaying the corresponding first pixel value of the display data on the see-through display. In some implementations, method 900 includes displaying the corresponding second pixel value of the display data on the see-through display.

Figure 10:
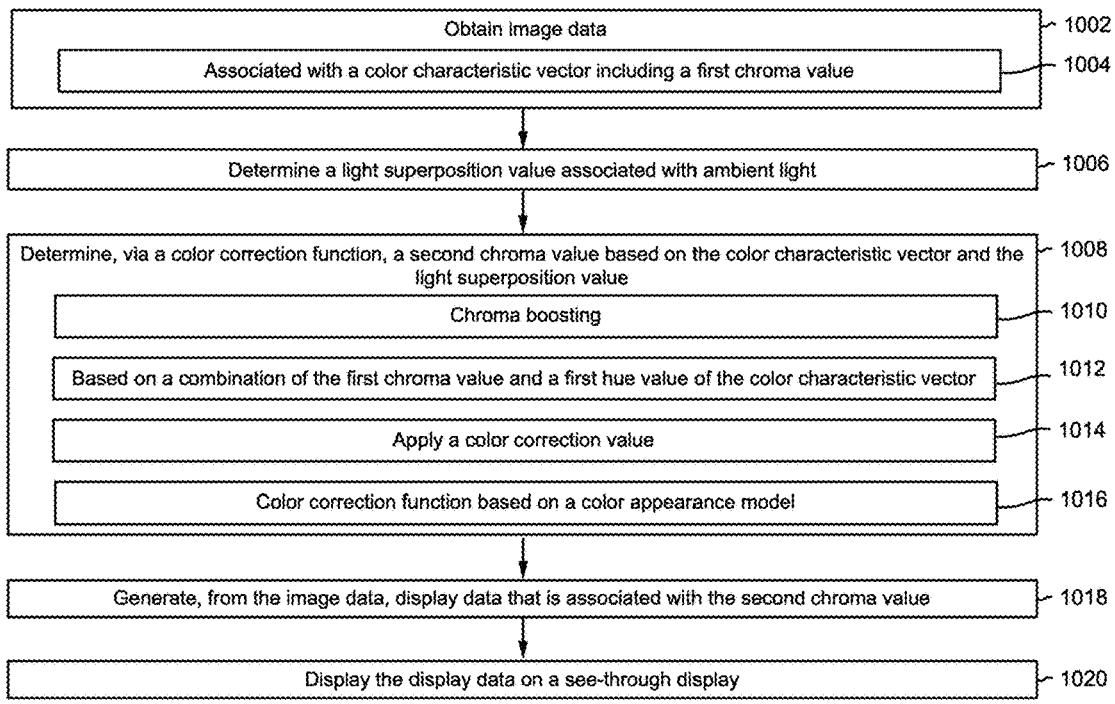
FIG. 10 is an example of a flow diagram of a method of performing chroma modification with respect to image data based one or more light superposition values in accordance with some implementations.

FIG. 10 is an example of a flow diagram of a method 1000 of performing chroma modification with respect to image data based one or more light superposition values in accordance with some implementations. In various implementations, the method 1000 or portions thereof are performed by an electronic device including a see-through display (e.g., the electronic device 100 in FIG. 1). In various implementations, the method 1000 or portions thereof are performed by the system 210. In various implementations, the method 1000 or portions thereof are performed by a head-mountable device (HMD) including a see-through display. In some implementations, the method 1000 is performed by processing logic, including hardware, firmware, software, or a combination thereof. In some implementations, the method 1000 is performed by a processor executing code stored in a non-transitory computer-readable medium (e.g., a memory).

As represented by block 1002, in some implementations, the method 1000 includes obtaining image data (e.g., the image data 240 in FIG. 2). In some implementations, the image data represents computer-generated content, such as a computer-generated object or a computer-generated surface. The image data may represent two-dimensional (2D) content (e.g., heads-up display (HUD) or mixed reality (MR) image) or three-dimensional (3D) content (e.g., a virtual couch). As represented by block 1004, the image data that associated with a color characteristic vector that includes a first chroma value. The first chroma value characterizes the chroma of the image data. For example, first chroma value indicates a colorfulness of a corresponding area of the image data, based on a proportion of the brightness of a similarly illuminated area that appears white or highly transmitting. In some implementations, the color characteristic vector includes other color characteristic values associated with the image data, such as a hue value, a saturation value, or a luminance value.

As represented by block 1006, the method 1000 includes determining a light superposition value that quantifies ambient light from a physical environment. For example, the light superposition value quantifies a combination of a luminance associated with the ambient light and a chromaticity associated with the ambient light. In various implementations, the method 1000 includes determining the light superposition value based on sensor data. For example, with reference to FIG. 2, the sensor subsystem 220 outputs ambient light sensor data and/or image sensor data. Other examples of sensor data include visual inertial odometry (VIO) data and inertial measurement unit (IMU) data.

As represented by block 1008, the method 1000 includes determining, via a color correction function, a second chroma value based on the color characteristic vector and the light superposition value. The first chroma value is different from the second chroma value. The second chroma value is associated with display data, as will be described below. In some implementations, as described with reference to FIG. 2, the chroma modifier 256 in FIG. 2 determines the second chroma value. For example, the light superposition value indicates a respective chromaticity value and a respective luminance value, and the second chroma value satisfies a color contrast threshold with respect to one or more of the respective chromaticity value and the respective luminance value. In some implementations, the color correction function is further based on a user preference, such as a display brightness preference or a display saturation preference. For example, the user preference biases the chroma modifier 256 such that the second chroma value satisfies the user preference within a threshold.

As represented by block 1010, in some implementations, the second chroma value is greater than the first chroma, sometimes referred to as "chroma boosting." An example of a chromaticity associated with chroma boosting is illustrated in FIG. 5. In some implementations, the chroma boosting may shift the hue and chroma of the image data. Chroma boosting may be used to enhance the color of the display data. For example, the method 1000 includes chroma boosting to perform chroma enhancement based on the hue and the chroma of the image data and the ambient light.

As another example, some implementations, the second chroma value is less than the first chroma value.

As represented by block 1012, in some implementations, determining the second chroma value is based on a combination of the first chroma value and a first hue value of the color characteristic vector. The first hue value characterizes the hue of the image data. In some implementations, the method 1000 includes determining, for display data, a second hue value based on the first hue value. The second hue value is different from the first hue value. For example, the second hue value correspond to a shifted version of the first hue value.

As represented by block 1014, in some implementations, the method 1000 includes applying a color correction value to the first chroma value in order to determine the second chroma value. To that end, the method 1000 includes determining, via the color correction function, the color correction value based on the light superposition value and the color characteristic vector. For example, the chroma correction value indicates a chroma correction and/or a hue correction.

As represented by block 1016, in some implementations, the color correction function is based on a color appearance model. A color appearance model provides perceptual aspects of human color vision, such as the extent to which viewing conditions of a color diverge from the corresponding physical measurement of the stimulus source. For example, the color appearance model is associated with a CIELAB color space. The color appearance model may indicate certain moods or emotions that may result from the viewing of certain colors, such as memory color (e.g., the sky is blue). The color appearance model may provide color harmony principles, such as which colors look good against certain background colors associated with light from a physical environment.

As represented by block 1018, the method 1000 includes generating, from the image data, display data (e.g., the display data 258 in FIG. 2) that is associated with the second chroma value. For example, with reference to FIG. 5, the image data is characterized by the original chromaticity 506, and the display data is characterized by the chroma boosted chromaticity 508. As represented by block 1020, the method 1000 includes displaying the display data on the see-through display.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, and a see-through display:
determining first and second light superposition values that are associated with ambient light from a physical environment, wherein the first light superposition value quantifies the ambient light incident on a first region of the see-through display, and wherein the second light superposition value quantifies the ambient light incident on a second region of the see-through display, wherein the first region is adjacent to the second region;
modifying a first pixel value of image data, via a color correction function, in order to generate a corresponding first pixel value of display data, wherein the color correction function is based on a combination of the first and second light superposition values; and
displaying the corresponding first pixel value of the display data on the see-through display.

2. The method of claim 1, wherein the second region corresponds to a surrounding region that surrounds the background region.

3. The method of claim 1, wherein the first region corresponds to a background region that includes a first pixel of the see-through display, and wherein the first pixel is associated with the first pixel value of image data.

4. The method of claim 3, wherein the color correction function modifies the first pixel value of image data via a chromatic adaption transform (CAT), based on the first light superposition value associated with the background region.

5. The method of claim 4, wherein the CAT utilizes a color correction matrix (CCM), and wherein generating the corresponding first pixel value of display data includes diagonally transforming the first pixel value of image data via the CCM.

6. The method of claim 4, wherein the CAT operates within long, medium, short (LMS) color space.

7. The method of claim 3, wherein the color correction function modifies the first pixel value of image data via a transparency model, based on the first light superposition value associated with the background region.

8. The method of claim 3, wherein the color correction function modifies the first pixel value of image data, via a CAT and a transparency model, based on the first light superposition value associated with the background region.

9. The method of claim 3, wherein the color correction function modifies the first pixel value of image data by:
determining a color induction value associated with the first pixel value of image data, based on a function of the second light superposition value associated with the second region; and
modifying the first pixel value of image data based on a function of the color induction value.

10. The method of claim 9, wherein the color induction value indicates a direction of color induction.

11. The method of claim 10, wherein the direction of color induction is away from a respective chromaticity value associated with the second light superposition value and towards a respective chromaticity value associated with the first pixel value of image data.

12. The method of claim 10, wherein the direction of color induction satisfies a complementary criterion with respect to a respective chromaticity value associated with the second light superposition value.

13. The method of claim 1, wherein modifying the first pixel value of the image data via the color correction function includes:
determining a first color corrected pixel value based on the first pixel value and the first light superposition value;
determining a second color corrected pixel value based on the first color corrected pixel value and the second light superposition value; and
generating the corresponding first pixel value of the display data based on a combination of the first and second color corrected pixel values.

14. The method of claim 1, further comprising:
obtaining the image data; and
performing perceptual correction on the image data based on one or more perceptual criteria.

15. The method of claim 1, wherein the color correction function is further based on metadata that is associated with the image data.

16. The method of claim 1, further comprising:
obtaining the image data; and
performing illumination correction on the image data, based on a combination of the first and second light superposition values.

17. The method of claim 1, further comprising:
modifying a second pixel value of the image data, via the color correction function, in order to generate a corresponding second pixel value of the display data, based on a function of the first and second light superposition values; and
displaying the corresponding second pixel value of the display data on the see-through display.

18. The method of claim 1, wherein the electronic device includes an environmental sensor that senses the ambient light and outputs corresponding sensor data, and wherein determining the first and second light superposition values is based on a function of the sensor data.

19. A system comprising:
a see-through display;
a light superposition value generator to determine first and second light superposition values that are associated with ambient light from a physical environment, wherein the first light superposition value quantifies the ambient light incident on a first region of the see-through display, and wherein the second light superposition value quantifies the ambient light incident on a second region of the see-through display, wherein the first region is neighboring to the second region;
a color correction subsystem to modify a first pixel value of image data, via a color correction function, in order to generate a corresponding first pixel value of display data, wherein the color correction function is based on a combination of the first and second light superposition values; and
a display driver to drive the see-through display with the corresponding first pixel value of the display data.

20. A non-transitory computer readable storage medium storing one or more programs, the one or more programs comprising instructions, which, when executed by an electronic device with one or processors and a see-through display, cause the electronic device to:
determine first and second light superposition values that are associated with ambient light from a physical environment, wherein the first light superposition value quantifies the ambient light incident on a first region of the see-through display, and wherein the second light superposition value quantifies the ambient light incident on a second region of the see-through display, wherein the second region at least partially surrounds the first region;

modify a first pixel value of image data, via a color correction function, in order to generate a corresponding first pixel value of display data, wherein the color correction function is based on a combination of the first and second light superposition values; and display the corresponding first pixel value of the display data on the see-through display.

21. The non-transitory computer readable storage medium of claim 20, wherein the second region corresponds to a surrounding region that surrounds the background region.

22. The non-transitory computer readable storage medium of claim 20, wherein the first region corresponds to a background region that includes a first pixel of the see-through display, and wherein the first pixel is associated with the first pixel value of image data.

23. The non-transitory computer readable storage medium of claim 20, wherein the color correction function modifies the first pixel value of image data via a chromatic adaption transform (CAT), based on the first light superposition value associated with the background region.

* * * * *